United States Patent
Brand et al.

(10) Patent No.: US 12,434,837 B2
(45) Date of Patent: Oct. 7, 2025

(54) TAILSITTER WITH PIVOTING POLE FOR CONTROLLING EXTERNAL LOADS

(71) Applicant: Textron Innovations Inc., Providence, RI (US)

(72) Inventors: Albert G. Brand, N. Richland Hills, TX (US); Robert P. Wardlaw, Keller, TX (US)

(73) Assignee: Textron Innovations Inc., Providence, RI (US)

( * ) Notice: Subject to any disclaimer, the term of this patent is extended or adjusted under 35 U.S.C. 154(b) by 130 days.

(21) Appl. No.: 17/942,670

(22) Filed: Sep. 12, 2022

(65) Prior Publication Data
US 2024/0083581 A1    Mar. 14, 2024

(51) Int. Cl.
*B64D 1/22* (2006.01)
*B66C 1/34* (2006.01)
*G05D 1/00* (2024.01)

(52) U.S. Cl.
CPC .............. *B64D 1/22* (2013.01); *G05D 1/106* (2019.05); *B66C 1/34* (2013.01); *G05D 1/0094* (2013.01)

(58) Field of Classification Search
CPC .. B64D 1/22; B64U 2101/64; B64U 2101/67; B64U 2101/66
See application file for complete search history.

(56) References Cited

U.S. PATENT DOCUMENTS

| | | | | |
|---|---|---|---|---|
| 1,825,329 | A * | 9/1931 | Adams | B64D 1/22 258/1.2 |
| RE22,212 | E * | 10/1942 | Kelton | B64D 1/22 258/1.8 |
| 2,364,042 | A * | 12/1944 | Anderson | B64D 1/22 258/1.2 |
| 3,044,818 | A * | 7/1962 | Tobey | B64D 1/22 294/82.26 |
| 3,601,342 | A | 8/1971 | Piasecki | |
| 3,743,107 | A | 7/1973 | Verschoof | |
| 3,904,156 | A | 9/1975 | Smith | |
| 3,971,533 | A * | 7/1976 | Slater | B64B 1/38 244/30 |

(Continued)

FOREIGN PATENT DOCUMENTS

| | | |
|---|---|---|
| CN | 105835548 B | 6/2016 |
| CN | 208393635 U | 1/2019 |

(Continued)

*Primary Examiner* — Joshua J Michener
*Assistant Examiner* — Michael B. Kreiner
(74) *Attorney, Agent, or Firm* — Frost Brown Todd LLP

(57) ABSTRACT

Load management system and methods are described for aircraft, including tailsitters. A load management system can comprise a pole coupled the fuselage and free to rotate and swing. The pole can comprise a cargo hook and a distal end that can be releasably coupled to a cargo cable or cargo. The pole can be coupled near its distal end to a retractable cable that is deployed from a position aft of the pole. During landing, takeoff, and when otherwise in hover mode, the retractable cable can be retracted—holding the pole along or near the fuselage. During transition to, or during, flight mode, the retractable cable can be deployed which can harmonize the cargo's center of gravity with the needs of the tailsitter aircraft.

17 Claims, 10 Drawing Sheets

(56) References Cited

U.S. PATENT DOCUMENTS

| | | | | |
|---|---|---|---|---|
| 4,013,270 A * | 3/1977 | Laky | ............... | B66D 1/28 |
| | | | | 254/269 |
| 4,113,207 A * | 9/1978 | Dalziel | ............... | B64D 1/22 |
| | | | | 441/83 |
| 4,170,341 A * | 10/1979 | Jacobson | ............... | B64D 1/22 |
| | | | | 254/327 |
| 4,750,691 A | 6/1988 | Hollrock et al. | | |
| 5,494,240 A * | 2/1996 | Waugh | ............... | B64D 1/22 |
| | | | | 294/119.2 |
| 6,086,015 A * | 7/2000 | MacCready, Jr. | ............... | B64D 1/22 |
| | | | | 244/45 R |
| 6,533,220 B2 | 3/2003 | Schuster | | |
| 7,887,011 B1 | 2/2011 | Baldwin | | |
| 7,954,766 B2 | 6/2011 | Brainard et al. | | |
| 8,366,049 B2 | 2/2013 | Karem | | |
| 8,646,728 B2 * | 2/2014 | Schuster | ............... | B64D 1/22 |
| | | | | 244/137.4 |
| 8,752,796 B2 | 6/2014 | Occhiato et al. | | |
| 9,205,922 B1 | 12/2015 | Bouwer | | |
| 9,475,575 B2 | 10/2016 | Rossi | | |
| 9,758,353 B2 * | 9/2017 | Schafer | ............... | B66C 1/34 |
| 10,556,682 B2 | 2/2020 | Mons et al. | | |
| 10,752,353 B2 * | 8/2020 | Parkhurst | ............... | B64C 29/02 |
| 11,027,843 B2 * | 6/2021 | Prager | ............... | B64D 1/22 |
| 11,440,658 B2 * | 9/2022 | Yasuda | ............... | B64D 1/12 |
| 11,577,835 B2 * | 2/2023 | Ivans | ............... | B64U 30/10 |
| 2015/0001485 A1 | 1/2015 | Kang | | |
| 2018/0086462 A1 | 3/2018 | Holzer | | |

FOREIGN PATENT DOCUMENTS

| | | |
|---|---|---|
| DE | 19623562 A1 | 12/1997 |
| EP | 1904564 B1 | 9/2011 |
| EP | 2429897 B1 | 5/2020 |
| JP | 6393888 B2 | 9/2018 |
| WO | WO2018057034 A1 | 3/2018 |
| WO | WO2020139307 A1 | 7/2020 |
| WO | WO2020247870 A1 | 12/2020 |

\* cited by examiner

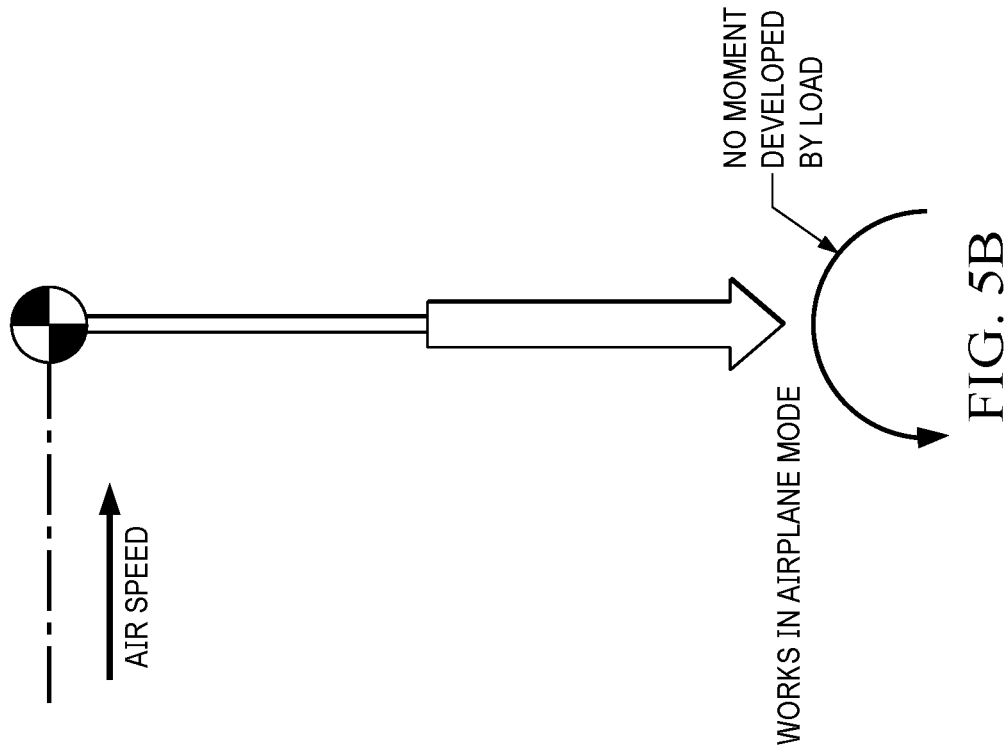
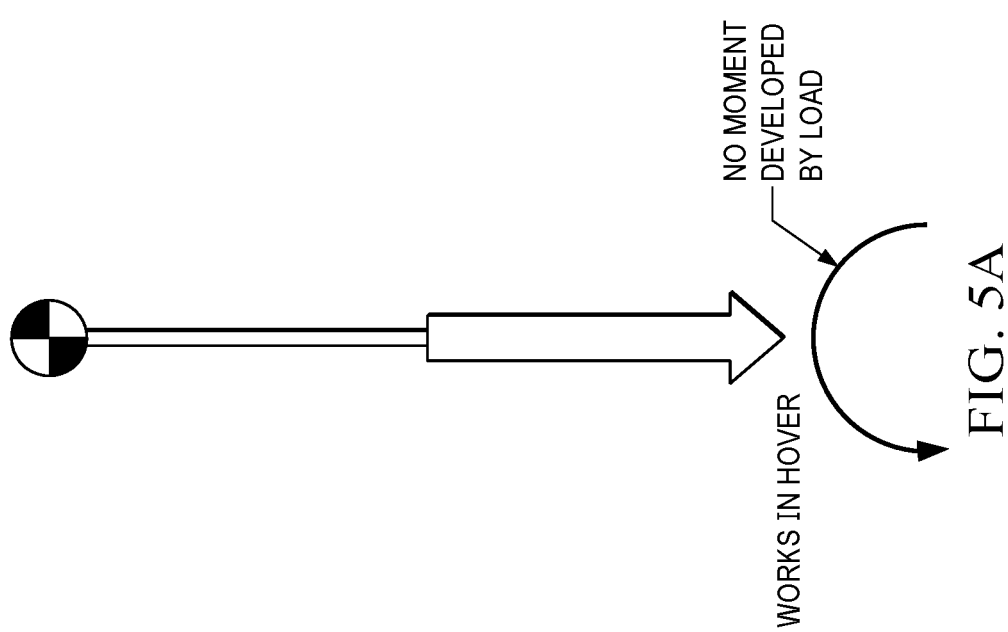

TAILSITTER WITH PIVOTING POLE FOR CONTROLLING EXTERNAL LOADS

TECHNICAL FIELD

The present disclosure is directed to aircraft and more particularly to external load management for tailsitting aircraft.

BACKGROUND OF THE INVENTION

Aircraft are often used to deliver cargo. Some aircraft, drones, rotorcraft, tailsitters, and others use external load carrying systems. Cargo, external loads in particular, can have a large impact on an aircraft's center of gravity. This is especially true for any vertical takeoff aircraft that can change between hover and cruise modes, such as various types of tilt rotors, tailsitters, and similar models. As a result, external load management systems that worked for helicopters or airplanes may not be optimal for other designs.

BRIEF SUMMARY OF THE INVENTION

One embodiment under the present disclosure comprises a load management system for a tailsitter aircraft. The system comprises a connection line configured to be coupled to a fuselage at a first end and comprising a cargo hook at a second end. It further comprises a retractable cable configured to be deployed from the aft end of the fuselage, the retractable cable coupled to the second end of the connection line and configured to be retracted during hover mode of the tailsitter aircraft and to deploy at least a portion of its length during transition to flight mode.

Another embodiment comprises a method of operating a tailsitter aircraft. The method comprises taking off in hover mode with a cargo attached to a load management system, the load management system comprising; a pole configured to be coupled to a fuselage of the aircraft at a first end and comprising a cargo hook at a second end coupled to the cargo; and a retractable cable configured to be deployed from a first end of the fuselage, the retractable cable coupled to the second end of the pole at a distal end and configured to be retracted during hover mode of the aircraft and to deploy at least a portion of its length during transition to flight mode and during flight mode. The method can further comprise transitioning to flight mode; and deploying at least a portion of the retractable cable during the transitioning. This can harmonize the cargo's center of gravity with the needs of the tailsitter aircraft center of gravity.

A further embodiment comprises a controller for an aircraft capable of hover flight and forward flight. The controller comprises processing circuitry configured to control a load management system comprising; a pole (or cable) coupled to a fuselage of the aircraft at its base and comprising a cargo hook at a first distal end; and a retractable cable configured to be deployed at a first end from the fuselage aft of the pole and coupled to the pole at a second distal end. The controller also comprises a memory coupled to the processing circuitry and having instructions stored therein that are executable by the processing circuitry to perform operations comprising; taking off in hover mode; transitioning to flight mode; and deploying at least a portion of the retractable cable during the transitioning.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIGS. 5A-5B display pitch behavior of an attachment point at the aircraft center of gravity;

DETAILED DESCRIPTION OF THE INVENTION

Figure 1:
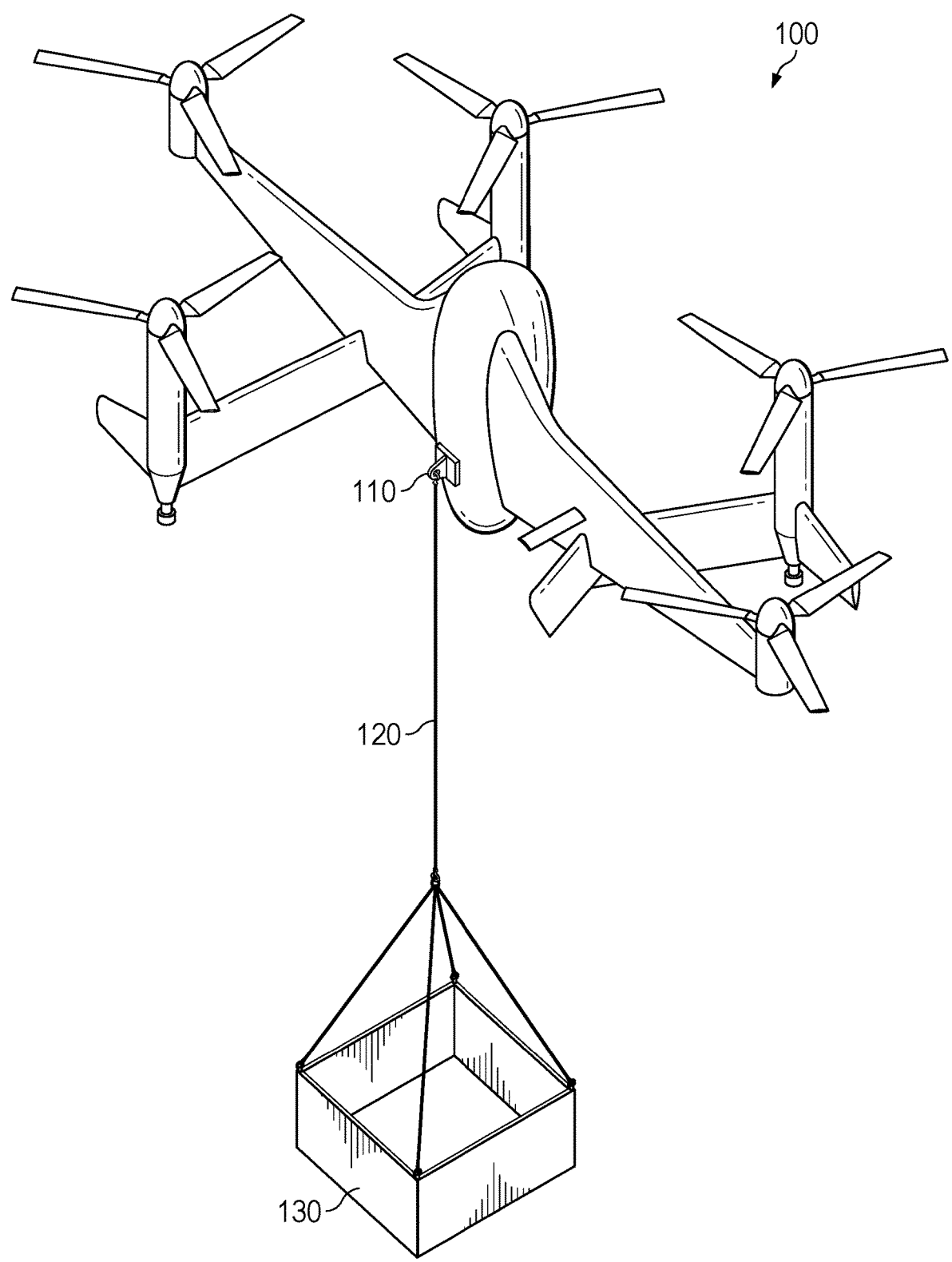
FIG. 1 displays a prior art cargo hook for a tailsitter aircraft that does not allow the aircraft to transition to a forward flight mode.

Embodiments under the present disclosure include systems and methods for a load management solution for tailsitters or similar aircraft. FIG. 1 shows a prior art solution. Tailsitter 100 comprises a stationary attachment hook 110, holding a cargo line 120 from a load 130. Attachment hook 110 may allow large angular movement of the cargo line 120 and load 130. As tailsitter 100 takes off in hover mode, and then transitions to flight mode, the load 130 and cargo line 120 can undergo large movements that can produce significant moments about the center of gravity of tailsitter 100, and can bring risk and danger from instability. The prior art solution in FIG. 1 is only useful in hover mode.

FIGS. 2A-3B illustrate several idealized attachment points or lines of action for a pole or cable carrying a load on a tailsitter aircraft while in its vertical flight orientation. The illustrations show that, for embodiments under the present disclosure, it is preferred that the load have a line of action below the aircraft center of gravity during hover mode. In contrast, during cruise mode, it is preferred that the load have a line of action forward of the aircraft center of gravity or on the aircraft center of gravity. These are some of the aspects missing in the prior art.

Figure 2A:
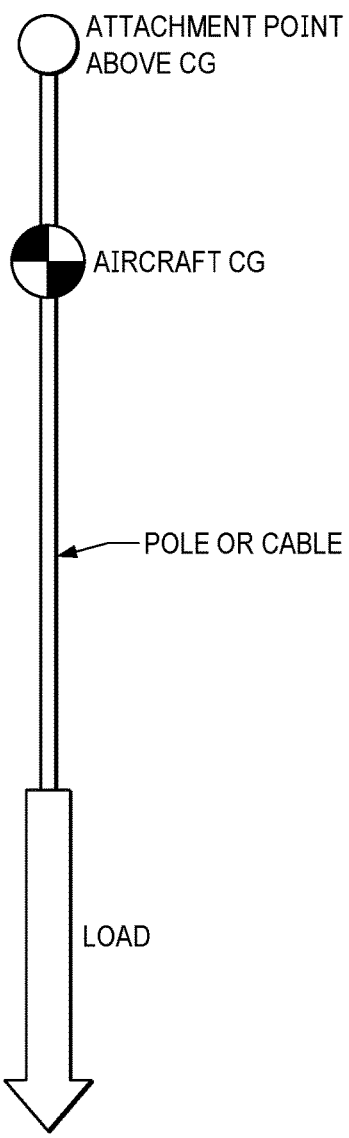
FIGS. 2A-2B display pitch behavior of an attachment point above the aircraft center of gravity.
Figure 2B:
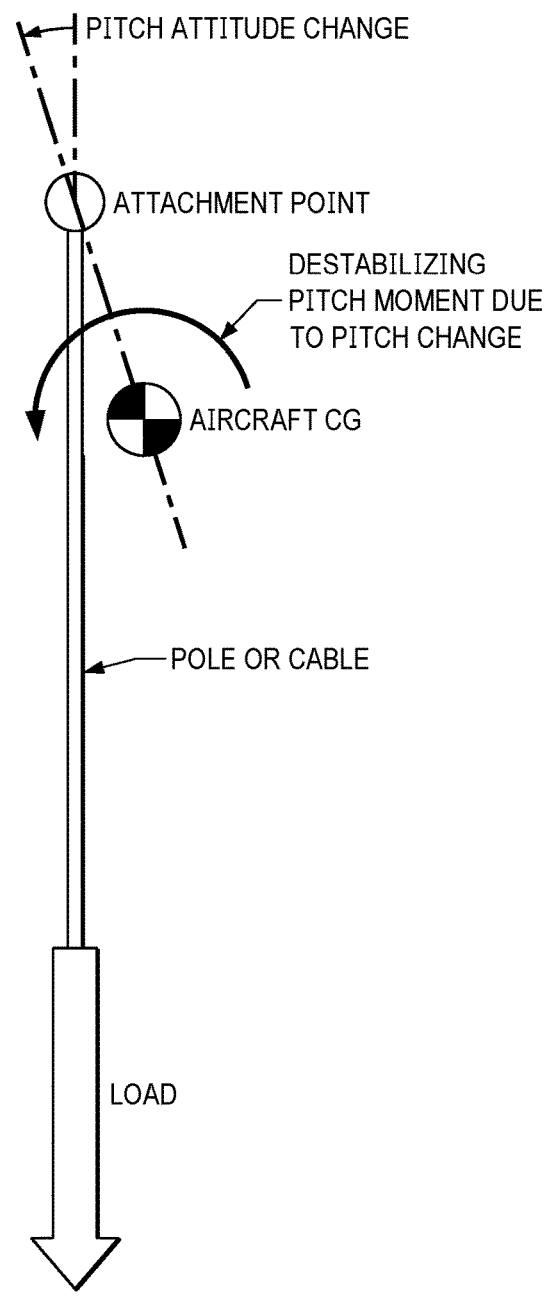

FIGS. 2A-2B illustrate hover mode when a pole/cable carrying a load has an attachment point above the aircraft center of gravity (cg). A slight change in aircraft pitch from FIG. 2A to FIG. 2B (due to a disturbance) results in a pitch moment that tends to increase the initial pitch change. As FIG. 2B illustrates, any slight pitch results in the load adding to the disturbance with an additional destabilizing moment. As a result, an attachment point above the aircraft center of gravity is not desirable for hover mode.

Figure 3A:
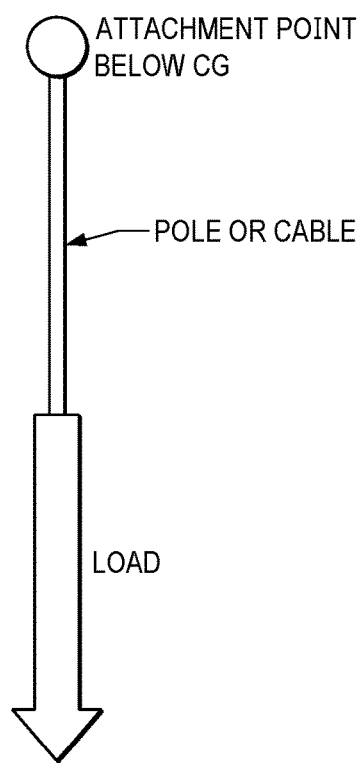
FIGS. 3A-3B display pitch behavior of an attachment point below the aircraft center of gravity.
Figure 3B:
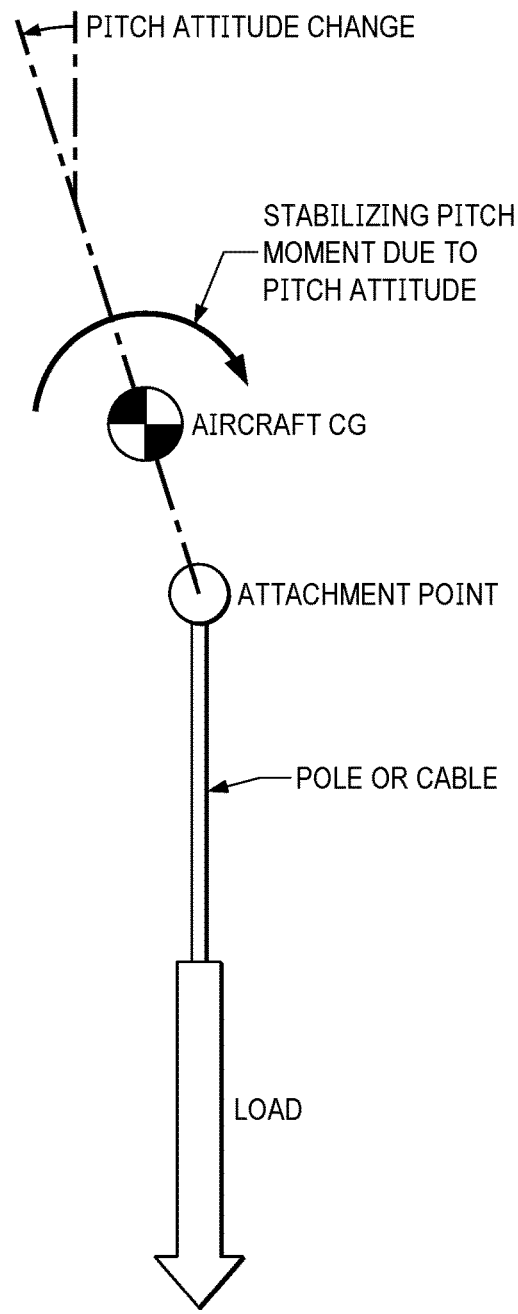

FIGS. 3A-3B illustrate hover mode when a pole/cable load carrying system has a line of action below the aircraft center of gravity. In FIG. 3A, similar to FIG. 2A, while the load remains on the same vertical axis as the aircraft center of gravity there is no stability problem. However, as shown in FIG. 3B, with the point below the aircraft cg, the line of action due to a pitch change is stabilizing. It is seen that the load applies a restoring/stabilizing moment during a pitch displacement. This shows that in hover mode, the best attachment point (or line of action) is at a point below the tailsitter aircraft center of gravity. Depending on the tailsitter aircraft's control power (ability to develop pitch moment), FIG. 3B illustrates that the stabilizing moment applied by the load can make it difficult for the tailsitter aircraft to pitch forward to achieve its forward flight mode unless the load's line of action is close to the aircraft center of gravity.

Figure 4B:
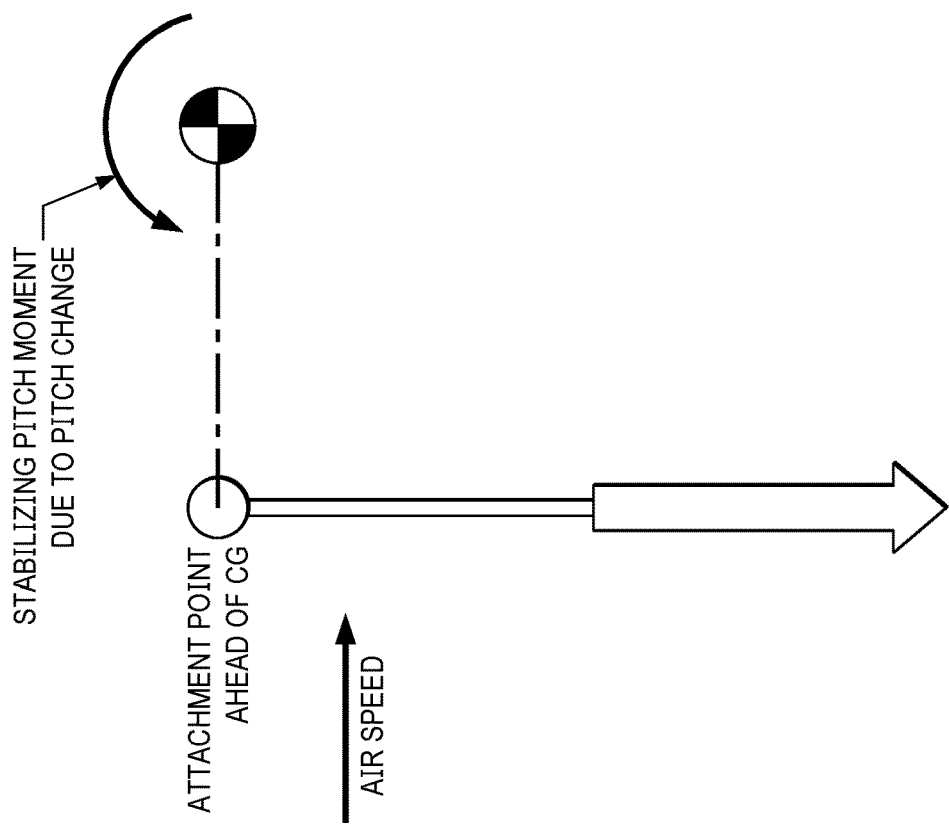
FIGS. 4A-4B display pitch behavior during forward flight.
Figure 4A:
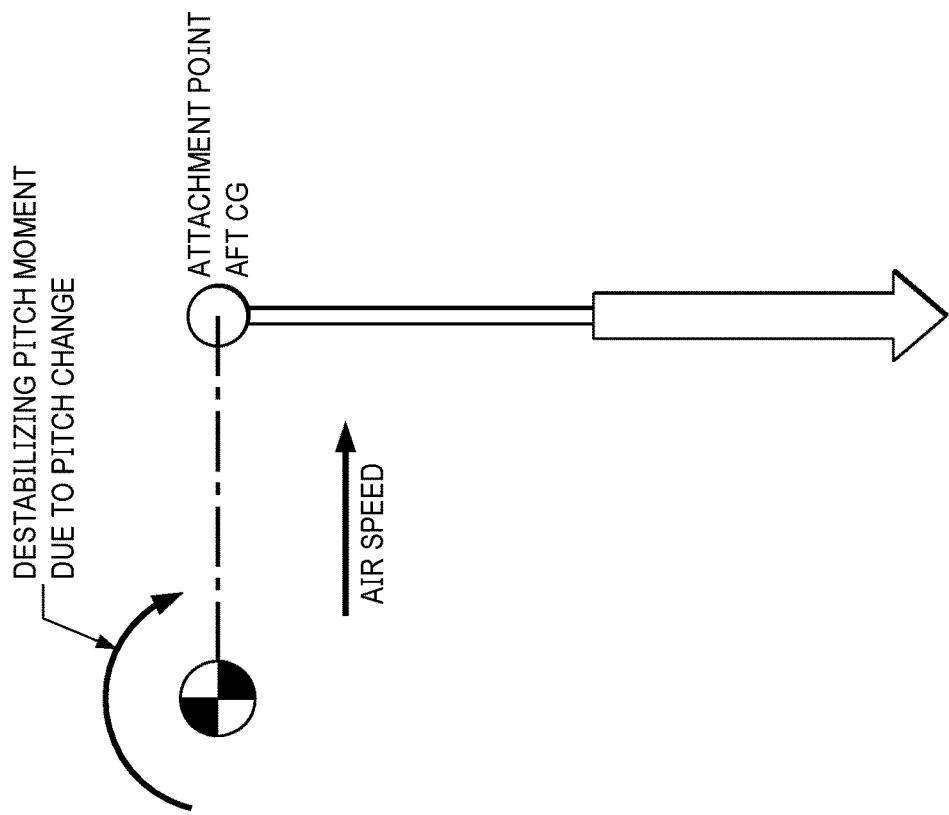

FIGS. 4A-4B illustrate the idealized moments created by the vertical load acting through different points during cruise mode, with the direction of flight indicated by the airspeed vector. In this configuration the tailsitter flies on its wing and the rotors act as propellers. In FIG. 4A, the load's line of action is aft of the aircraft center of gravity. In this configuration an increase in aircraft pitch, due to a disturbance, will produce an increase in aircraft lift which is resisted by the inertia of the load. Thus, the load acts to further increase the aircraft pitch, which is destabilizing. In a vertical acceleration, the load's force increases and causes the aircraft's pitch to increase, which increases the vertical acceleration. In FIG. 4B, the load acts through a point forward of the aircraft center of gravity. As in FIG. 4A, an increase in aircraft pitch results in an increase in aircraft lift. However, with the load ahead of the aircraft center of gravity, the vertical acceleration is reacted by the load's inertia resulting in a decrease in pitch that reduces the lift. Thus, the configuration of FIG. 4B is stabilizing. In hover, this configuration is similar to FIG. 2B, which was destabilizing, but in cruise mode it is stabilizing. Thus, for the tailsitter, a method is needed to shift the load between hover and cruise to that it is stable in hover and stable in cruise.

FIGS. 5A-5B illustrate an attachment point (or line of action) directly on the aircraft center of gravity. As illustrated, this setup is functional for both hover mode (FIG. 5A) and cruise or flight mode (FIG. 5B). However, these configurations only provide neutral stability instead of positive load stability.

As these figures illustrate, one failure of the existing solutions, and one advantage of certain embodiments of the present disclosure, is the ability to combine the hover mode functionality shown in FIGS. 3A and/or 5A, and the cruise/flight mode capabilities of FIGS. 4B and/or 5B.

Figure 6:
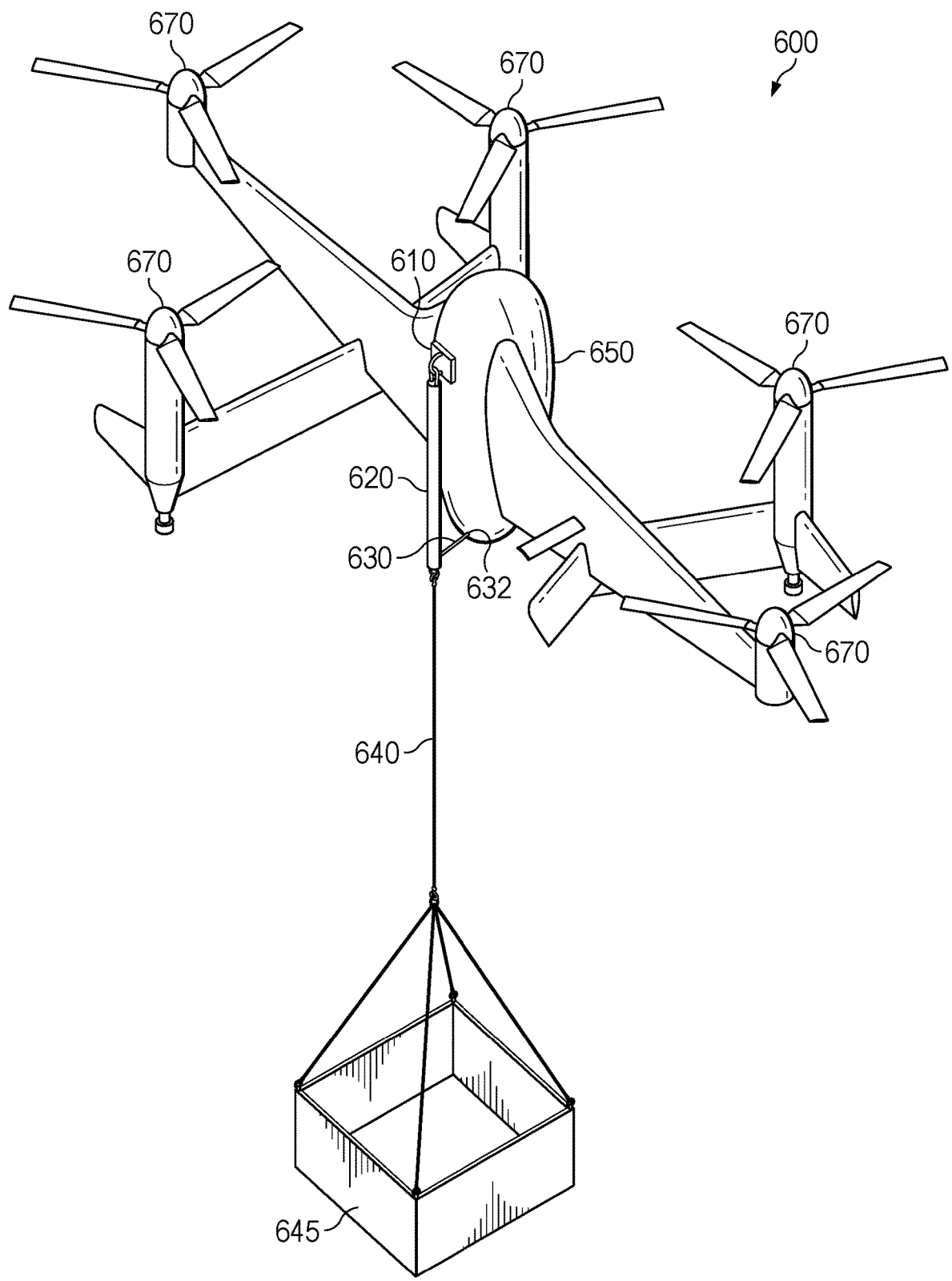
FIG. 6 displays a load management system embodiment of an aircraft in hover mode under the present disclosure.
Figure 7:
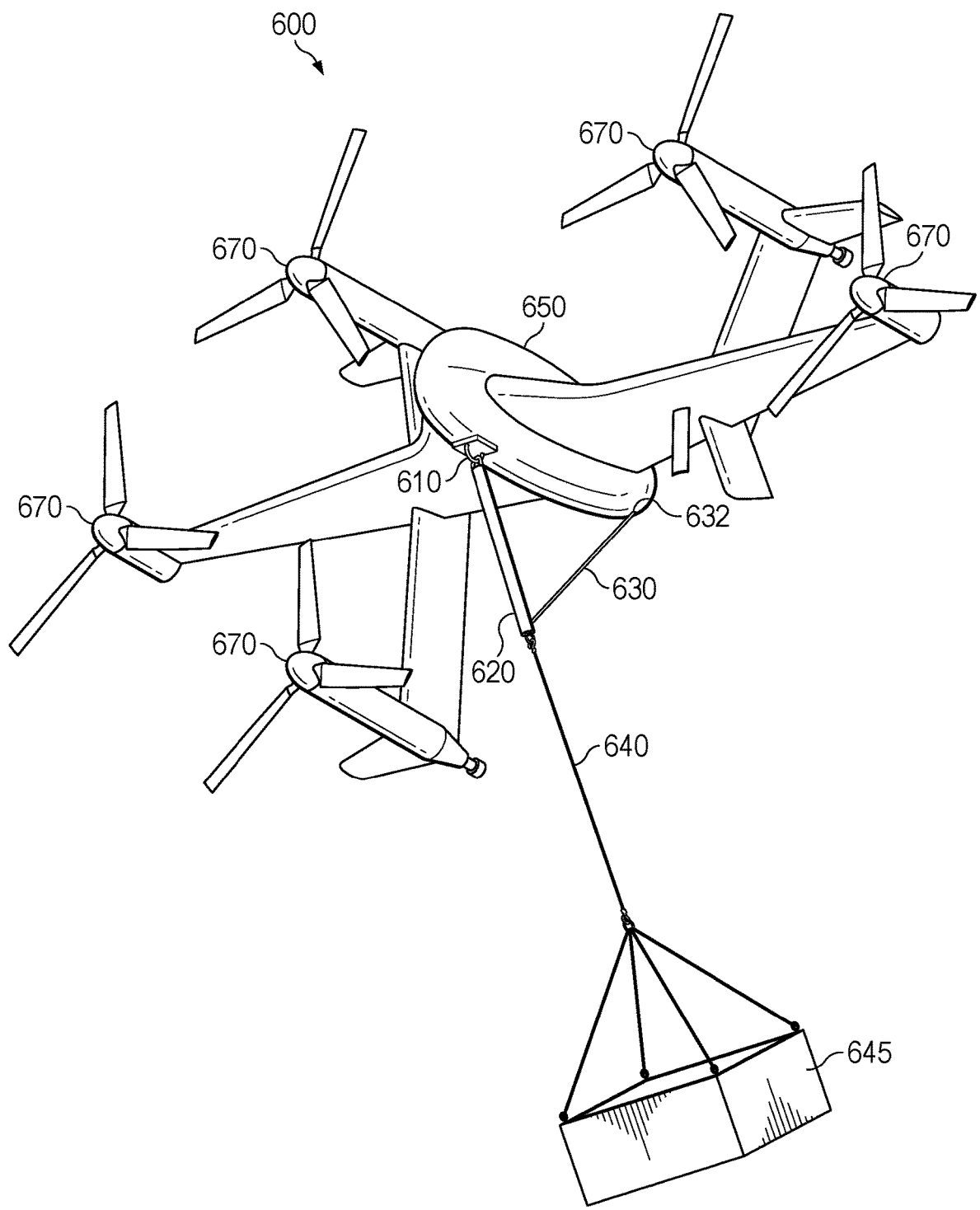
FIG. 7 displays a load management system embodiment of an aircraft in flight mode under the present disclosure.

FIG. 6 shows a possible embodiment under the present disclosure. Tailsitter 600 comprises a pivot point 610, pole 620, and a motorized tension or retractable cable 630 all coupled to the fuselage 650. Rotors 670 provide thrust. Load cable 640 couples the pole 620 to load 645, possibly via a cargo hook. FIG. 6 shows tailsitter 600 in a vertical orientation (hover mode). As tailsitter 600 takes off and shifts to flight mode (FIG. 7), load 645 will undergo various movements and sways about pole 620 and pivot point 610. This embodiment shows a pole 620. However, other embodiments can utilize a cable in place of pole 620. As shown in FIG. 7, the load 645 will be acting through, and is effectively attached to the fuselage at, a point between pivot point 610 and point 632 where the retractable cable 630 meets the fuselage 650. In the embodiment shown, and for purposes of hover mode stability, it is preferred that effective attachment be located at, or aft (below, in this view), of the aircraft center of gravity. During hover mode the retractable cable 630 can remain retracted, thereby holding the pole 620 along fuselage 650 and keeping point 610 and point 632 as a pair of load attachment points.

Referring now to FIG. 7, tailsitter 600 can be seen in flight mode. Retractable cable 630 has been extended or unspooled a portion of its length to allow load 645 to shift forward with respect to fuselage 650. It is preferred that retractable cable 630 comprise a different cable than load cable 640. Pole 620 is preferably coupled to fuselage 650 at pivot point 610 via a ball joint, universal joint or other coupling means that allows for angular rotation. Coupling means or joints with less rotational versatility can be used as well. During forward flight mode it is preferred that the load 645 have an attachment point (or line of action due to gravity or aircraft acceleration) that is at or forward of the aircraft center of gravity. To achieve this, the retractable cable 630 can be deployed. The deployment of retractable cable 630 can shift the line of action of load 645 forward, accounting for the drag load on load 645, placing the line of action of load 645 in a favorable position ahead, or through the aircraft center of gravity. A controller controlling retractable cable 630 can, in some embodiments, detect the angle of cable 640 to monitor the line of action of load 645 depending on how much retractable cable 630 is deployed. The controller can choose the best position for the line of action of load 645 depending on various factors: aircraft weight, load weight, aircraft center of gravity location, pitch, speed, and other factors.

Figure 8:
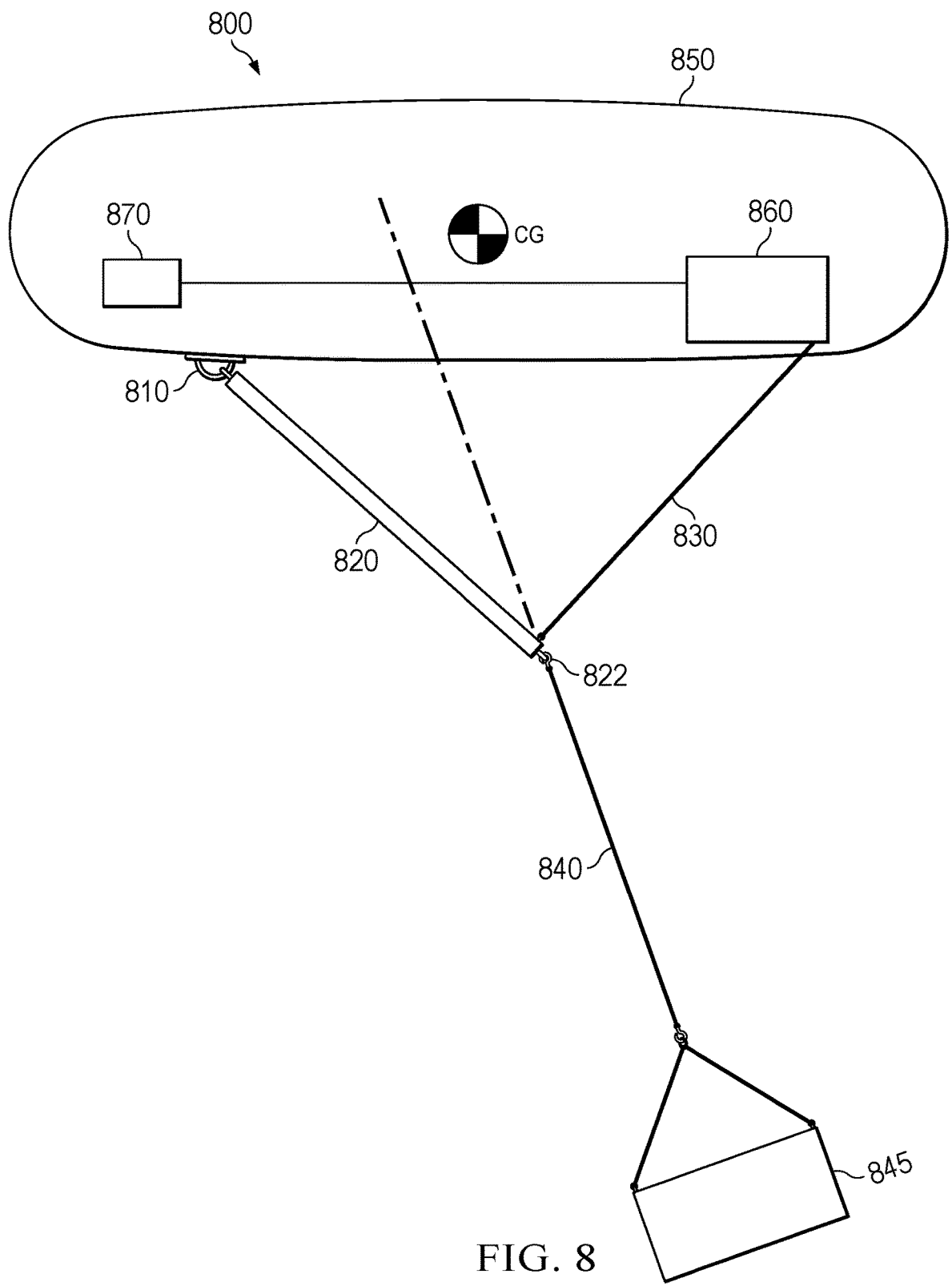
FIG. 8 displays a load management system embodiment of an aircraft under the present disclosure.

FIG. 8 shows an enlarged view of a load management system 800 similar to those described in FIGS. 6 and 7. Pivot point 810 couples pole 820 to fuselage 850. Tension cable 830 is deployable and connects to a distal end of pole 820 and/or load cable 840. Load cable 840 is coupled to load 845. Hook 822 can couple load cable 840 to pole 820. Tension cable 830 is retractable and deployable by gearing 860. Gearing 860 can be controlled by a pilot/user via a control system or controller 870. Controller 870 can also be preprogrammed to adjust gearing 860 autonomously without human intervention. Gearing 860 can comprise a spool of cable that is deployed and retracted. Other actuation means could be used as well. Gearing 860 can in some embodiments be disposed outside of the fuselage 850. Controller 870 can be coupled to hook 822 so as to control the dropping or deployment of load 845. Hook 822 can comprise an actuator to release load cable 840 and load 845, such as by a releasing arm or other means. Gearing 860 can be powered by an electric or combustion engine in fuselage 850 that forms a part of a tailsitter or other aircraft. A variety of power supplies could be used. When not carrying a load 845, it is preferred for tension cable 430 to be retracted so as to position pole 820 along the fuselage 850, resulting in the lowest drag.

Load management system 800, and other embodiments described herein, have numerous advantages over other solutions. Other solutions in the prior art are spring-based, which could allow the load to become destabilized if accelerations are introduced or if the spring is not sized for the external load or the load under g-forces. The gearing or spooled motor described herein can provide precise control of external cargo via the retractable/tension cable. Some prior art solutions utilize complex cargo attachment mechanisms with multiple pulleys, numerous joints and poles, and many components. The embodiments described herein can provide cargo attachment and manipulation with fewer components and only two structural load points on the aircraft. The pole shown in FIGS. 6 and 7 can be replaced with a cable in certain embodiments. One advantage of the pole is that it can handle compression loads if the load swings forward. However, since the load would normally keep both the pole and tension/retracting cable in tension, the pole is not necessary in every embodiment. Embodiments of the present disclosure can also provide attachment of cargo, and cargo release, from various positions including hover mode, flight mode, on ground, and in the air. When not in use, the retractable cable can pull the pole along the fuselage, minimizing drag and minimizing risks due to external components being crushed or puncturing other components (such as fuel tanks) in case of a crash. Embodiments under the present disclosure can be implemented in a variety of aircraft, such as tailsitters, tilt rotors, multi-rotors, quad-copters, helicopters, airplanes, and other aircraft.

Figure 9:
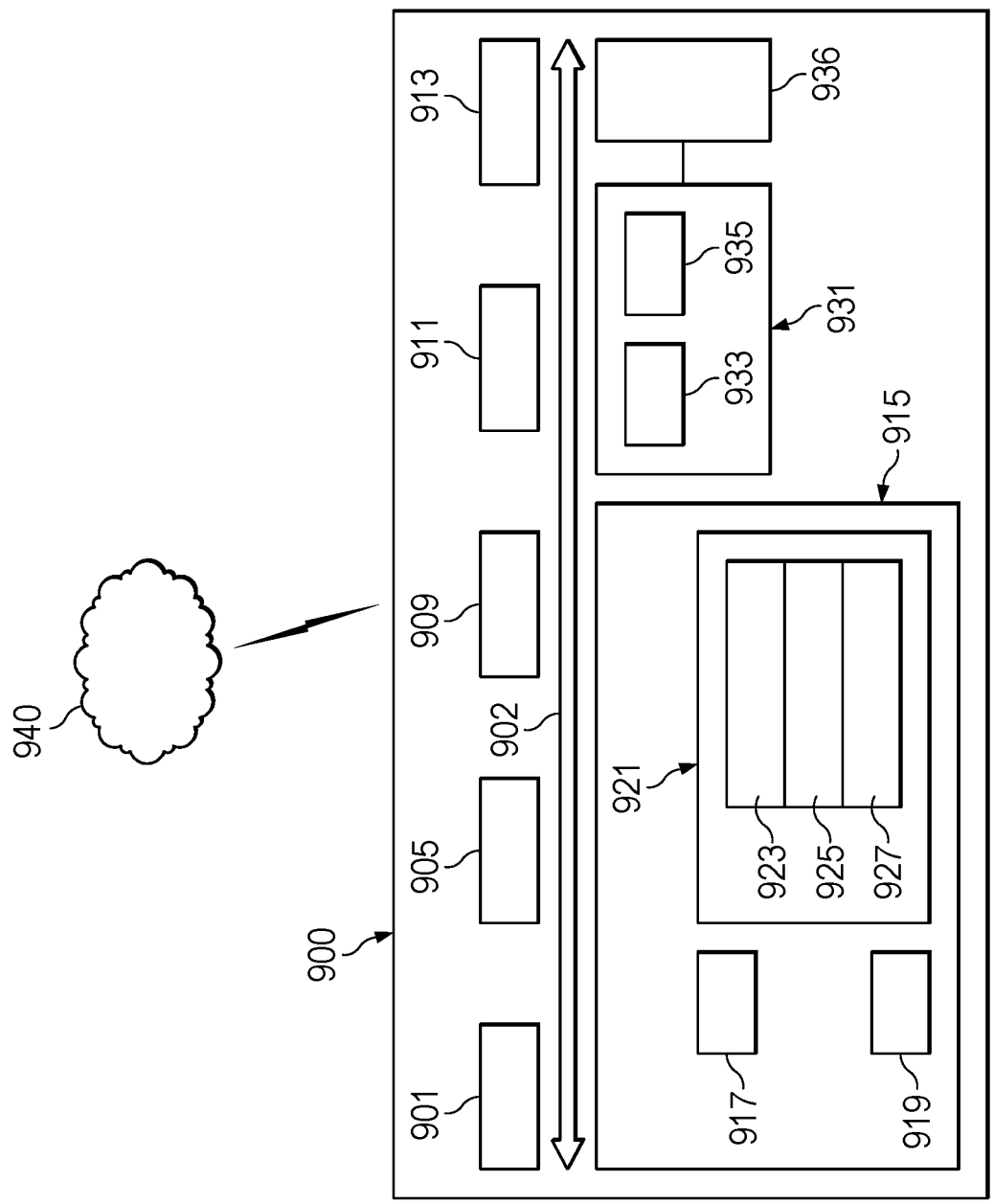
FIG. 9 is a schematic of a controller embodiment under the present disclosure.

FIG. 9 shows a schematic block diagram of a possible embodiment of a controller 900 under the present disclosure. Controller 900 can resemble and/or comprise controller 870 of FIG. 8. Controller 900 includes processing circuitry 901 that is operatively coupled via a bus 902 to an input/output interface 905, a power source 913, a memory 915, network interface 909, communication interface 911, and/or any other component, or any combination thereof. Certain controllers may utilize all or a subset of the components shown in FIG. 9. The level of integration between the components may vary from one controller to another. Further, certain controllers may contain multiple instances of a component, such as multiple processors, memories, transceivers, transmitters, receivers, etc.

The processing circuitry 901 is configured to process instructions and data and may be configured to implement any sequential state machine operative to execute instructions stored as machine-readable computer programs in the memory 915. The processing circuitry 901 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above.

In the example, the input/output interface 905 may be configured to provide an interface or interfaces to an input device, output device, or one or more input and/or output devices. Examples of an output device include a speaker, a display, a monitor, an actuator, another output device, or any combination thereof. An input device may allow a user to capture information for the controller 500. Examples of an input device include a touch or presence-sensitive display, a camera, a microphone, a sensor, a mouse, a trackball, a smartcard, and the like. The display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. One possible sensor under the present disclosure could comprise a weight or motion sensor configured to detect if cargo has been coupled to the load management system and may include detecting of the line of action of the load cable. An output device may use the same type of interface port as an input device. For example, a Universal Serial Bus (USB) port may be used to provide an input device and an output device.

In some embodiments, the power source 913 is structured as an engine, generator, a battery, or battery pack, compressed air, a hydraulic pump, or combination of these. Other types of power sources, such as an external power source (e.g., an electricity outlet), photovoltaic device, or power cell, may be used. The power source 913 may further include power circuitry for delivering power from the power source 913 itself, and/or an external power source, to the various parts of the controller 900 via input circuitry or an interface such as an electrical power cable. Delivering power may be, for example, for charging of the power source 913. Power circuitry may perform any formatting, converting, or other modification to the power from the power source 913 to make the power suitable for the respective components of the controller 900 to which power is supplied.

The memory 915 may be or be configured to include memory such as random-access memory (RAM) 917, read-only memory (ROM) 919, optical disks, hard disks, flash drives, and so forth. In one example, the memory 915 includes one or more application programs 925, such as an operating system 923, web browser application, a widget, gadget engine, or other application, and corresponding data 927. The memory 915 may store, for use by the controller 900, any of a variety of various operating systems 923, application programs 925, or combinations of the foregoing. In certain embodiments of the present disclosure, there is provided a computer-readable storage medium having stored thereon an operating system 923 or application program 925 which, when executed on at least one processor, causes the at least one processor to carry out any applicable method according to the present disclosure.

The memory 915 may be configured to include a number of physical drive units 921, such as redundant array of independent disks (RAID), flash memory, USB flash drive, external hard disk drive, thumb drive, internal hard disk drive, smartcard memory such as tamper resistant module in the form of a universal integrated circuit card (UICC) including one or more subscriber identity modules (SIMs), such as a USIM and/or ISIM, other memory, or any combination thereof. The memory 915 may allow the controller 900 to access instructions, application programs and the like, stored on transitory or non-transitory memory media, to off-load data, or to upload data. An article of manufacture, such as one utilizing a control system or aircraft, may be tangibly embodied as or in the memory 515, which may be or comprise a device-readable storage medium.

The processing circuitry 901 may be configured to communicate with an access network or other network 940 using the communication interface 911 or network interface 909. The communication interface 911 may comprise one or more communication subsystems 931 and may include or be communicatively coupled to an antenna 936. The communication interface 911 may include one or more transceivers 939 used to communicate, such as by communicating with one or more remote transceivers of another device capable of wireless communication (e.g., a remote server or a network node in an access network). Each transceiver 939 may include a transmitter 933 and/or a receiver 935 appropriate to provide network communications (e.g., optical, electrical, frequency allocations, and so forth). Moreover, the transmitter 933 and receiver 935 may be coupled to one or more antennas (e.g., antenna 936) and may share circuit components, software or firmware, or alternatively be implemented separately. Network interface 909 may provide communicative coupling to local components over a local network, such as any components of an aircraft controlled by controller 900. A local network can be wired or wireless. A local network can comprise network 940 in certain embodiments. In the illustrated embodiment, communication functions of the communication interface 911 or network interface 909 may include cellular communication, Wi-Fi communication, voice communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), and so forth. Regardless of the type of sensor, a controller 900 may provide an output of data captured by its sensors (such as e.g., input/output interface 905), through its communication interface 911, via a wireless (or wired) connection.

As another example, controller 900 may comprise or control an actuator, a motor, or a switch, such as described in relation to a load management system or to the flight functionality of an aircraft. Controller 900 can receive wireless input via a wireless connection. In response to the received input the states of the actuator, the motor, or the switch may change. For example, the controller 900 may comprise a motor that adjusts the control surfaces or rotors of a drone in flight according to the received input. In certain embodiments, the load state can be used for feedback for control inputs. This may allow the controller 900 to determine if certain load states are limiting to an aircraft's planned maneuvers. For example, feedback may indicate to a controller 900 that the cable tensioner is degraded and slow. This can indicate that the retractable cable (and load) may not move quick enough for certain maneuvers, and the controller can choose another maneuver or indicate to a user what maneuvers are safer and what maneuvers are more dangerous.

In practice, any number of controllers may be used together with respect to a single use case. For example, a first controller might be or be integrated in a drone and provide the drone's speed information (obtained through a speed sensor) to a second controller that is a remote controller operating the drone. When the user makes changes from the remote controller, the first controller may adjust the throttle on the drone (e.g., by controlling an actuator) to increase or decrease the drone's speed. The first and/or the second controller can also include more than one of the functionalities described above. For example, a controller might comprise the sensor and the actuator, and handle communication of data for both the speed sensor and the actuators.

Figure 10:
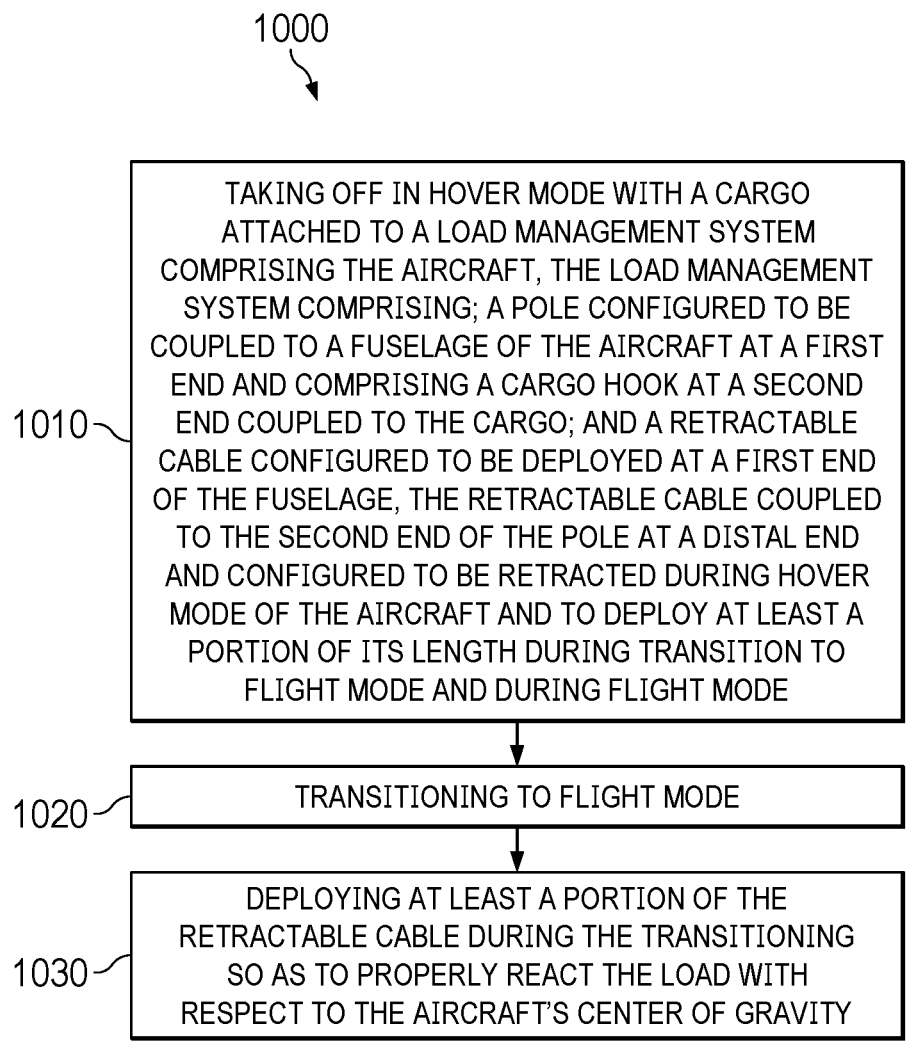
FIG. 10 is a flow chart of a method embodiment under the present disclosure.

FIG. 10 illustrates one possible method embodiment 1000 under the present disclosure. Method 1000 comprises a method of operating an aircraft, such as a tailsitter. Step 1010 is taking off in hover mode with a cargo attached to a load management system, the load management system comprising; a pole or cable configured to be coupled to a fuselage of the aircraft at a first end and comprising a cargo hook at a second end coupled to the cargo; and a retractable cable configured to be deployed from/near a first end of the fuselage, the retractable cable coupled to the second end of the pole at a distal end and configured to be retracted during hover mode of the aircraft and to deploy at least a portion of its length during transition to flight mode and during flight mode. Further steps can be optional in certain embodiments. Step 1020 is transitioning to flight mode. Step 1030 is deploying at least a portion of the retractable cable during the transitioning so as to properly react the load with respect to the aircraft's center of gravity. Method 1000 can comprise additional steps and variations. Further steps can include detecting a position of the retractable cable, how much length is deployed, an angle of the retractable cable, center of gravity of the aircraft, speed, or other factors, and based upon the detected factors, choose a maneuver, speed, position, pitch angle or other decision regarding aircraft operation. The cargo load could even be dropped, pulled in, or otherwise moved in response to flight conditions or other factors. Other possible steps in method 1000 can include receiving an indication that a cargo load has been attached to the pole or cable, or detecting that the cargo load has been attached by the weight or force it applies to the pole or cable. In certain embodiments, method 1000 can be computer-implemented, such as by controller 900, or by a remote computing device in communication with controller 900. In other embodiments, method 900 may be implemented by a pilot or other user manipulating an aircraft.

Computer System Embodiments

It will be appreciated that computer systems are increasingly taking a wide variety of forms. In this description and in the claims, the terms "controller," "computer system," or "computing system" are defined broadly as including any device or system—or combination thereof—that includes at least one physical and tangible processor and a physical and tangible memory capable of having thereon computer-executable instructions that may be executed by a processor. By way of example, not limitation, the term "computer system" or "computing system," as used herein is intended to include personal computers, desktop computers, laptop computers, tablets, hand-held devices (e.g., mobile telephones, PDAs, pagers), microprocessor-based or programmable consumer electronics, minicomputers, mainframe computers, multi-processor systems, network PCs, distributed computing systems, datacenters, message processors, routers, switches, and even devices that conventionally have not been considered a computing system, such as wearables (e.g., glasses).

The memory may take any form and may depend on the nature and form of the computing system. The memory can be physical system memory, which includes volatile memory, non-volatile memory, or some combination of the two. The term "memory" may also be used herein to refer to non-volatile mass storage such as physical storage media.

The computing system also has thereon multiple structures often referred to as an "executable component." For instance, the memory of a computing system can include an executable component. The term "executable component" is the name for a structure that is well understood to one of ordinary skill in the art in the field of computing as being a structure that can be software, hardware, or a combination thereof.

For instance, when implemented in software, one of ordinary skill in the art would understand that the structure of an executable component may include software objects, routines, methods, and so forth, that may be executed by one or more processors on the computing system, whether such an executable component exists in the heap of a computing system, or whether the executable component exists on computer-readable storage media. The structure of the executable component exists on a computer-readable medium in such a form that it is operable, when executed by one or more processors of the computing system, to cause the computing system to perform one or more functions, such as the functions and methods described herein. Such a structure may be computer-readable directly by a processor—as is the case if the executable component were binary. Alternatively, the structure may be structured to be interpretable and/or compiled—whether in a single stage or in multiple stages—so as to generate such binary that is directly interpretable by a processor.

The term "executable component" is also well understood by one of ordinary skill as including structures that are implemented exclusively or near-exclusively in hardware logic components, such as within a field programmable gate array (FPGA), an application specific integrated circuit (ASIC), Program-specific Standard Products (ASSPs), System-on-a-chip systems (SOCs), Complex Programmable Logic Devices (CPLDs), or any other specialized circuit. Accordingly, the term "executable component" is a term for a structure that is well understood by those of ordinary skill in the art of computing, whether implemented in software, hardware, or a combination thereof.

The terms "component," "service," "engine," "module," "control," "generator," or the like may also be used in this description. As used in this description and in this case, these terms—whether expressed with or without a modifying clause—are also intended to be synonymous with the term "executable component" and thus also have a structure that is well understood by those of ordinary skill in the art of computing.

While not all computing systems require a user interface, in some embodiments a computing system includes a user interface for use in communicating information from/to a user. The user interface may include output mechanisms as well as input mechanisms. The principles described herein are not limited to the precise output mechanisms or input mechanisms as such will depend on the nature of the device. However, output mechanisms might include, for instance, speakers, displays, tactile output, projections, holograms, and so forth. Examples of input mechanisms might include, for instance, microphones, touchscreens, projections, holograms, cameras, keyboards, stylus, mouse, or other pointer input, sensors of any type, and so forth.

Accordingly, embodiments described herein may comprise or utilize a special purpose or general-purpose computing system. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example—not limitation—embodiments disclosed or envisioned herein can comprise at least two distinctly different kinds of computer-readable media: storage media and transmission media.

Computer-readable storage media include RAM, ROM, EEPROM, solid state drives ("SSDs"), flash memory, phase-change memory ("PCM"), CD-ROM or other optical disk storage, magnetic disk storage or other magnetic storage devices, or any other physical and tangible storage medium that can be used to store desired program code in the form of computer-executable instructions or data structures and that can be accessed and executed by a general purpose or special purpose computing system to implement the disclosed functionality of the invention. For example, computer-executable instructions may be embodied on one or more computer-readable storage media to form a computer program product.

Transmission media can include a network and/or data links that can be used to carry desired program code in the form of computer-executable instructions or data structures and that can be accessed and executed by a general purpose or special purpose computing system. Combinations of the above should also be included within the scope of computer-readable media.

Further, upon reaching various computing system components, program code in the form of computer-executable instructions or data structures can be transferred automatically from transmission media to storage media (or vice versa). For example, computer-executable instructions or data structures received over a network or data link can be buffered in RAM within a network interface module (e.g., a "NIC") and then eventually transferred to computing system RAM and/or to less volatile storage media at a computing system. Thus, it should be understood that storage media can be included in computing system components that also—or even primarily—utilize transmission media.

Those skilled in the art will further appreciate that a computing system may also contain communication channels that allow the computing system to communicate with other computing systems over, for example, a network. Accordingly, the methods described herein may be practiced in network computing environments with many types of computing systems and computing system configurations. The disclosed methods may also be practiced in distributed system environments where local and/or remote computing systems, which are linked through a network (either by hardwired data links, wireless data links, or by a combination of hardwired and wireless data links), both perform tasks. In a distributed system environment, the processing, memory, and/or storage capability may be distributed as well.

Those skilled in the art will also appreciate that the disclosed methods may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Abbreviated List of Defined Terms

To assist in understanding the scope and content of this written description and the appended claims, a select few terms are defined directly below. Unless defined otherwise, all technical and scientific terms used herein have the same meaning as commonly understood by one of ordinary skill in the art to which the present disclosure pertains.

The terms "approximately," "about," and "substantially," as used herein, represent an amount or condition close to the specific stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a specifically stated amount or condition.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure or invention includes a specific reference to one or more embodiments thereof, and vice versa, and is intended to provide illustrative examples without limiting the scope of the invention, which is indicated by the appended claims rather than by the following description.

As used in the specification, a word appearing in the singular encompasses its plural counterpart, and a word appearing in the plural encompasses its singular counterpart, unless implicitly or explicitly understood or stated otherwise. Thus, it will be noted that, as used in this specification and the appended claims, the singular forms "a," "an" and "the" include plural referents unless the context clearly dictates otherwise. For example, reference to a singular referent (e.g., "a widget") includes one, two, or more referents unless implicitly or explicitly understood or stated otherwise. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

As used herein, directional terms, such as "top," "bottom," "left," "right," "up," "down," "upper," "lower," "proximal," "distal," "adjacent," and the like are used herein solely to indicate relative directions and are not otherwise intended to limit the scope of the disclosure and/or claimed invention

CONCLUSION

It is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise.

In addition, unless otherwise indicated, numbers expressing quantities, constituents, distances, or other measurements used in the specification and claims are to be understood as being modified by the term "about," as that term is defined herein. Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

Any headings and subheadings used herein are for organizational purposes only and are not meant to be used to limit the scope of the description or the claims.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention itemed. Thus, it should be understood that although the present invention has been specifically disclosed in part by preferred embodiments, exemplary embodiments, and optional features, modification and variation of the concepts herein disclosed may be resorted to by those skilled in the art, and such modifications and variations are considered to be within the scope of this invention as defined by the appended items. The specific embodiments provided herein are examples of useful embodiments of the present invention and various alterations and/or modifications of the inventive features illustrated herein, and additional applications of the principles illustrated herein that would occur to one skilled in the relevant art and having possession of this disclosure, can be made to the illustrated embodiments without departing from the spirit and scope of the invention as defined by the items and are to be considered within the scope of this disclosure.

It will also be appreciated that systems, devices, products, kits, methods, and/or processes, according to certain embodiments of the present disclosure may include, incorporate, or otherwise comprise properties or features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

All references cited in this application are hereby incorporated in their entireties by reference to the extent that they are not inconsistent with the disclosure in this application. It will be apparent to one of ordinary skill in the art that methods, devices, device elements, materials, procedures, and techniques other than those specifically described herein can be applied to the practice of the invention as broadly disclosed herein without resort to undue experimentation. All art-known functional equivalents of methods, devices, device elements, materials, procedures, and techniques specifically described herein are intended to be encompassed by this invention.

When a group of materials, compositions, components, or compounds is disclosed herein, it is understood that all individual members of those groups and all subgroups thereof are disclosed separately. When a Markush group or other grouping is used herein, all individual members of the group and all combinations and sub-combinations possible of the group are intended to be individually included in the disclosure. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. All changes which come within the meaning and range of equivalency of the items are to be embraced within their scope.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A load management system for a tailsitter aircraft, comprising:
    a connection line configured to be coupled to a fuselage at a first end and comprising a cargo hook at a second end, the connection line configured to be linear from the first end to the second end;
    a retractable cable configured to be deployed from the fuselage from a position aft of the first end of the connection line, the retractable cable coupled to the second end of the connection line and configured to be retracted during hover mode of the tailsitter aircraft and to deploy at least a portion of its length during transition to flight mode; and
    a controller in communication with the cargo hook, the controller being configured to retract and/or deploy the retractable cable to thereby position the cargo hook based on a center of gravity of the tailsitter aircraft.

2. The system of claim 1, wherein the retractable cable is configured to be deployed from within the fuselage.

3. The system of claim 1, further comprising a spool configured to rotate to deploy and retract the retractable cable.

4. The system of claim 3, wherein the spool is coupled to the fuselage.

5. The system of claim 1, wherein the cargo hook comprises a releasable hook.

6. The system of claim 1, the controller comprising a processor and a memory and configured to control the deployment of the retractable cable.

7. The system of claim 1, wherein the connection line comprises a pole.

8. The system of claim 1, wherein the connection line comprises a cable.

9. The system of claim 1, wherein the cargo hook is configured to hold the cargo during hover and flight mode, and wherein when the retractable cable is at least partially deployed during flight mode, the cargo is held aft of the first end of the connection line and forward of the position aft of the connection line.

10. The system of claim 1, wherein the controller is further configured to retract and/or deploy the retractable cable based on a current pitch of the tailsitter aircraft.

11. A load management system for a tailsitter aircraft, comprising:
    a connection line configured to be coupled to an exterior surface of a fuselage at a first end and comprising a cargo hook at a second end, wherein the connection line is configured to lay flat against an underside of the fuselage when the tailsitter is in hover mode, the connection line further configured to form a straight line from the first end to the second end during hover mode and during flight mode, the connection line being angularly rotatable about the straight line; and
    a retractable cable configured to be deployed from an aft end of the fuselage, the retractable cable coupled to the second end of the connection line and configured to be retracted during hover mode of the tailsitter aircraft and to deploy at least a portion of its length during transition to flight mode.

12. The system of claim 11, wherein the retractable cable is configured to be deployed from within the fuselage.

13. The system of claim 11, further comprising a spool configured to rotate to deploy and retract the retractable cable.

14. The system of claim 13, wherein the spool is coupled to the fuselage.

15. The system of claim 11, wherein the cargo hook comprises a releasable hook.

16. The system of claim 11, further comprising a controller, the controller comprising a processor and a memory and configured to control the deployment of the retractable cable.

17. A load management system for a tailsitter aircraft, comprising:
- a connection line configured to be coupled to a fuselage at a first end and comprising a cargo hook at a second end, the connection line configured to be linear from the first end to the second end;
- a retractable cable configured to be deployed from the fuselage from a position aft of the first end of the connection line, the retractable cable coupled to the second end of the connection line and configured to be retracted during hover mode of the tailsitter aircraft and to deploy at least a portion of its length during transition to flight mode; and
- a controller in communication with the cargo hook and configured to determine whether the tailsitter aircraft is in a hover mode or a flight mode, the controller being configured to retract and/or deploy the retractable cable based on whether the tailsitter aircraft is in the hover mode or the flight mode.

* * * * *